United States Patent
Barkan (10) Patent No.: US 8,622,305 B2
(45) Date of Patent: Jan. 7, 2014

(54) EFFICIENT MULTI-IMAGE BAR CODE READER

(75) Inventor: Edward D. Barkan, Miller Place, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 1106 days.

(21) Appl. No.: 12/178,053

(22) Filed: Jul. 23, 2008

(65) Prior Publication Data

US 2010/0019042 A1 Jan. 28, 2010

(51) Int. Cl.
*G06K 19/00* (2006.01)
(52) U.S. Cl.
USPC ........................ 235/462.41; 235/435; 235/439
(58) Field of Classification Search
USPC .................................. 235/375, 380, 454, 462
See application file for complete search history.

(56) References Cited

U.S. PATENT DOCUMENTS

| 2005/0011957 A1* | 1/2005 | Attia et al. ................ 235/462.46 |
| 2006/0022051 A1* | 2/2006 | Patel et al. ................ 235/462.14 |
| 2007/0080228 A1* | 4/2007 | Knowles et al. ......... 235/462.42 |
| 2009/0084854 A1* | 4/2009 | Carlson et al. ........... 235/462.41 |

\* cited by examiner

*Primary Examiner* — Michael G Lee
*Assistant Examiner* — Matthew Mikels
(74) *Attorney, Agent, or Firm* — Nong-Qiang Fan (57) ABSTRACT

An efficient multicamera imaging-based bar code reader for imaging a target bar code on a target object. An imaging system has a plurality of camera assemblies coupled to an image processing system. Each camera assembly includes a sensor array and an imaging lens assembly for focusing a field of view of the camera assembly onto a sensor array as well as including one or more light emitting diodes for illuminating a field of view of that camera assembly. One camera is activated or energized to detect an object and then all cameras are activated for generating images suitable to decode a bar code on the detected object.

23 Claims, 5 Drawing Sheets

EFFICIENT MULTI-IMAGE BAR CODE READER

FIELD OF THE INVENTION

The present invention relates to a multiple camera imaging-based bar code reader.

BACKGROUND OF THE INVENTION

Various electro-optical systems have been developed and used for reading optical indicia, such as bar codes. A bar code is a coded pattern of graphical indicia comprised of a series of bars and spaces of varying widths, the bars and spaces having differing light reflecting characteristics. The pattern of the bars and spaces encode information. Bar code may be one dimensional (e.g., UPC bar code) or two dimensional (e.g., DataMatrix bar code). Systems that read, that is, image and decode bar codes employing imaging camera systems are typically referred to as imaging-based bar code readers or bar code scanners.

Imaging-based bar code readers may be portable or stationary. A portable bar code reader is one that is adapted to be held in a user's hand and moved with respect to a target indicia, such as a target bar code, to be read, that is, imaged and decoded. Stationary bar code readers are mounted in a fixed position, for example, relative to a point-of-sales counter. Target objects, e.g., a product package that includes a target bar code, are moved or swiped past one of the one or more transparent windows and thereby pass within a field of view of the stationary bar code readers. The bar code reader typically provides an audible and/or visual signal to indicate the target bar code has been successfully imaged and decoded. Sometimes barcodes are presented, as opposed to swiped. This typically happens when the swiped barcode failed to scan, so the operator tries a second time to scan it. Alternately, presentation is done by inexperience users, such as when the reader is installed in a self check out installation.

A typical example where a stationary imaging-based bar code reader would be utilized includes a point of sale counter/cash register where customers pay for their purchases. The reader is typically enclosed in a housing that is installed in the counter and normally includes a vertically oriented transparent window and/or a horizontally oriented transparent window, either of which may be used for reading the target bar code affixed to the target object, i.e., the product or product packaging for the product having the target bar code imprinted or affixed to it. The sales person (or customer in the case of self-service check out) sequentially presents each target object's bar code either to the vertically oriented window or the horizontally oriented window, whichever is more convenient given the specific size and shape of the target object and the position of the bar code on the target object.

A stationary imaging-based bar code reader that has a plurality of imaging cameras can be referred to as a multi-camera imaging-based scanner or bar code reader. In a multi-camera imaging reader, each camera system typically is positioned behind one of the plurality of transparent windows such that it has a different field of view from every other camera system. While the fields of view may overlap to some degree, the effective or total field of view of the reader is increased by adding additional camera systems. Hence, the desirability of multicamera readers as compared to signal camera readers which have a smaller effective field of view and require presentation of a target bar code to the reader in a very limited orientation to obtain a successful, decodable image, that is, an image of the target bar code that is decodable.

The camera systems of a multi-camera imaging reader may be positioned within the housing and with respect to the transparent windows such that when a target object is presented to the housing for reading the target bar code on the target object, the target object is imaged by the plurality of imaging camera systems, each camera providing a different image of the target object. U.S. patent application Ser. No. 11/862,568 filed Sep. 27, 2007 entitled 'Multiple Camera Imaging Based Bar Code Reader' is assigned to the assignee of the present invention and is incorporated herein by reference.

SUMMARY OF THE INVENTION

The present disclosure concerns a multi-camera imaging-based bar code reader and a method of operating a multicamera imaging-based bar code reader in an efficient manner.

In some uses, a barcode reader that has multiple imagers or cameras in a single housing can provide better functionality than a reader having only a single imager. Such readers have multiple illumination systems to illuminate the fields of view of multiple imagers or cameras. For example, a system that uses six imagers will have six illumination systems, one associated with each imager.

An illustrative multi-camera imaging-based bar code reader for imaging a target bar code on a target object has a housing supporting one or more transparent windows for viewing objects. An imaging system has a number of cameras positioned within a housing interior region that define a field of view which is different than a field of view of each other camera in the reader. Each camera includes a sensor array and its own illumination system such as one or more light emitting diodes. An image processing system includes a processor having a stored program for evaluating images from a subset of cameras that define the bar code reader field of view to determine a presence of a target object and once a target object is detected, to activate an additional one or more cameras for use in decoding a barcode.

These and other objects, advantages, and features of the exemplary embodiment of the invention are described in detail in conjunction with the accompanying drawings.

DETAILED DESCRIPTION

An exemplary embodiment of a multicamera imaging-based bar code scanner or reader 10 of the present invention is shown schematically in the Figures. As depicted in FIG. 7, the bar code reader 10 includes circuitry 11 comprising an image system 12 which includes a plurality of imaging cameras C1, C2, C3, C4, C5, C6, which produce raw gray scale images, and an image processing system 14, which includes one or more processors 15 and a decoder 16 that analyzes the gray scale images from the cameras and decodes imaged target bar codes, if present. The imaging system 12 is capable of reading, that is, imaging and decoding both 1D and 2D bar codes and postal codes. The reader 10 is also capable of capturing images and signatures. The decoder 16 may be integrated into the reader 10 or may be a separate system, as would be understood by one of skill in the art.

Figure 1:
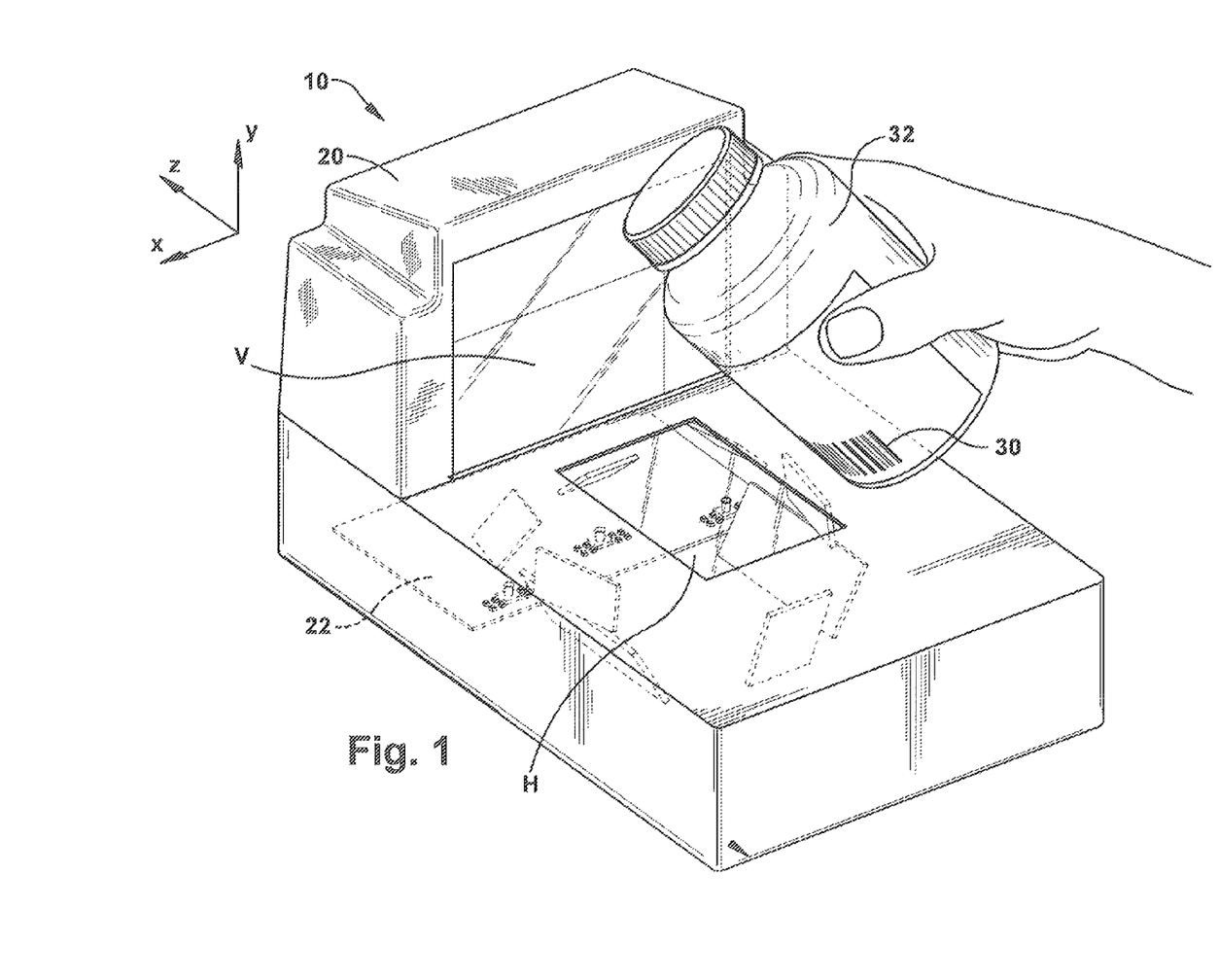
FIG. 1 is a perspective view of a bar code reader having a vertical and a horizontal window through which bar codes are viewed by multiple cameras within the reader.
Figure 2:
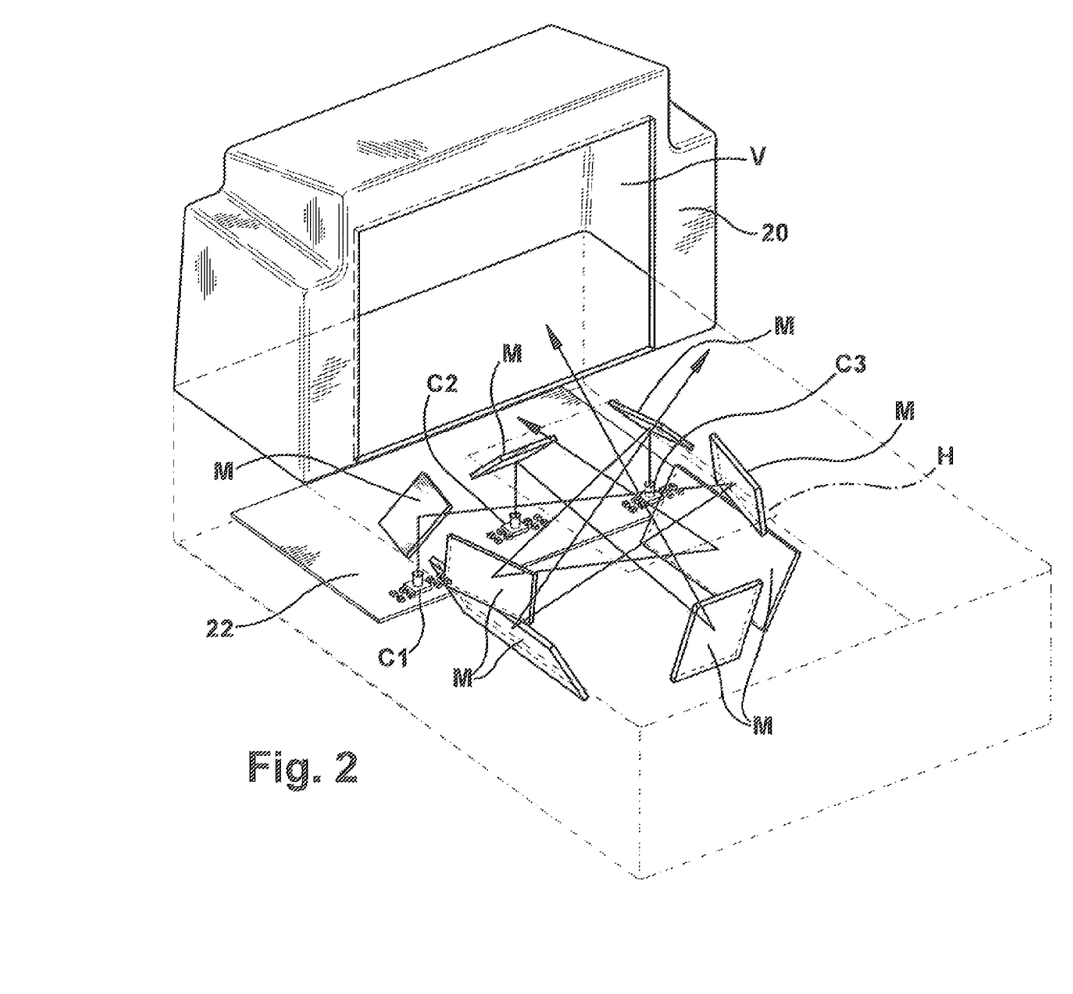
FIG. 2 is a perspective view of the reader of FIG. 1 with a portion of the reader housing removed to illustrate a plurality of cameras.
Figures 3, 4:
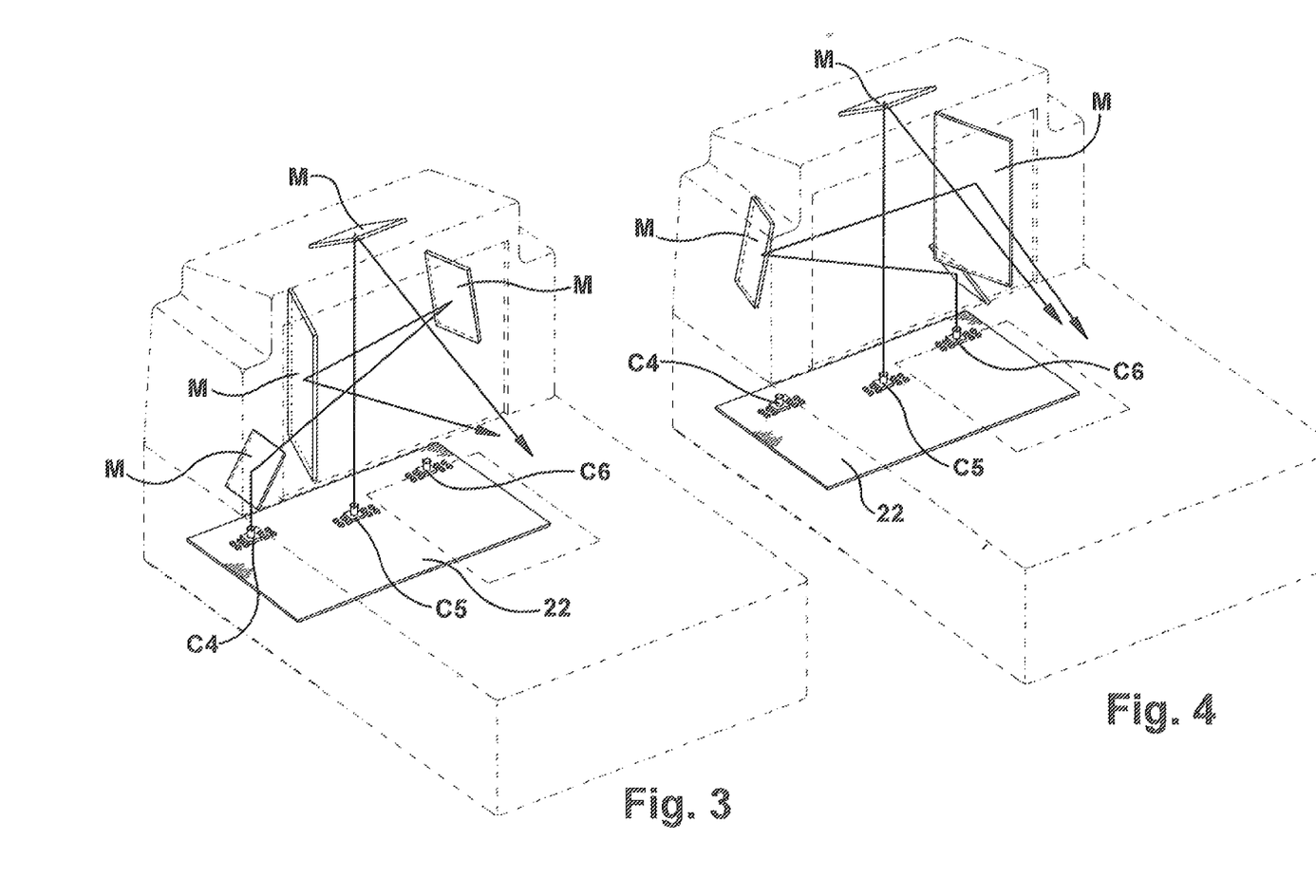
FIGS. 3 and 4 are perspective views showing a position of three additional cameras on a printed circuit board resulting in a total of six cameras.

In one exemplary embodiment, the reader 10 is stationary and the image and decoder systems are supported within an interior region 18 of a housing 20 (see FIG. 1). The housing 20 may be integrated into a sales counter that of a point of sales system that includes, for example, a cash register, a touch screen visual display or other type user interface and a printer for generating sales receipts. The housing 20 depicted in FIG. 1 includes two transparent windows H, V.

In the exemplary embodiment, the cameras C1-C6 are mounted to a printed circuit board 22 inside the housing and each camera defines a two dimensional field of view FV1, FV2, FV3, FV4, FV5, FV6. Positioned behind and adjacent to the windows H, V are reflective mirrors M that help define a given camera field of view such that the respective fields of view FV1-FV6 pass from the housing 20 through the windows creating an effective total field of view TFV for the reader 10 in a region of the windows H, V, outside the housing 20. Because each camera C1-C6 has an effective working range WR (shown schematically in FIG. 5) over which a target bar code 30 may be successfully imaged and decoded, there is an effective target area in front of the windows H, V within which a target bar code 30 presented for reading may be successfully imaged and decoded.

In the exemplary reader, three of the cameras C4-C6, look out of a vertical window V with the help of reflecting mirrors and three cameras C1-C3 look out of a horizontal window H. In use, a user slides a package or container 32 with a barcode through a region in front of the windows. The barcode may be visible to cameras behind the vertical window, or to cameras behind the horizontal window, or both. The barcode may move through the center of the field of view of the cameras, or through one end or the other of the field of view.

Each camera assembly C1-C6 of the imaging system 12 captures a series of image frames of its respective field of view FV1-FV6. The series of image frames for each camera assembly C1-C6 is shown schematically as IF1, IF2, IF3, IF4, IF5, IF6 in FIG. 7. Each series of image frames IF1-IF6 comprises a sequence of individual image frames generated by the respective cameras C1-C6. As seen in the drawings, the designation IF1, for example, represents multiple successive images obtained from the camera C1. As is conventional with imaging cameras, the image frames IF1-IF6 are in the form of respective digital signals representative of raw gray scale values generated by each of the camera assembly C1-C6.

An exemplary illumination system 60 has one or more high energy light emitting diodes L1-L6 associated with each of the cameras C1-C6. These high power LEDs when simultaneously energized generate sufficient heat to raise the internal temperature of the reader 10 to an undesirable degree. Excessive heat can reduce the reliability and brightness of the LEDs, can reduce the signal quality of the image system and can also reduce the reliability of other electronic systems that are enclosed in the housing interior 11 along with the imagers and illumination systems 60. The housing of the reader must be sealed to keep dust and other contaminants off the optical system so that the reader cannot be cooled with vents or fans that circulate external air into the housing.

The image sensors themselves also use power and thus generate heat, adding to the bad effects heat buildup in the housing produce. Since heat cannot be easily expelled from the reader housing, it is one goal of the exemplary system to reduce heat generation within the housing. This is done without degrading the performance of the reader. In particular, bar code readers must be able to read barcodes that are moving through the total field of view TFOV with a speed of approximately 100 inches per second, regardless of the orientation of the target object with respect to the windows and regardless on what side of the object contains the bar code.

In accordance with one use, either a sales person or a customer will present a product or target object 32 selected for purchase to the housing 20. More particularly, a target bar code 30 imprinted or affixed to the target object will be presented in a region near the windows H, V for reading, that is, imaging and decoding of the coded indicia of the target bar code. Upon a successful reading of the target bar code, a visual and/or audible signal will be generated by the reader 10 to indicate to the user that the target bar code 30 has been successfully imaged and decoded. The successful read indication may be in the form of illumination of a light emitting diode (LED) 34a (FIG. 5) and/or generation of an audible sound by a speaker 34b upon generation of an appropriate signal from the decoder 16.

In order to reduce heat generation and power consumption, the illumination LEDs and/or image sensors S1-S6 are de-energized whenever they are not needed to read barcodes. In order for the scanners performance to not be negatively impacted, however, the components must be energized very quickly as soon as a barcode, or an object that might be bearing a barcode enters the scan field. This energization must be very quick because the ability of the imagers to capture image frames is limited to around 30 or 60 frames per second, depending on what kind of image sensor is being used. A barcode can be traveling through the field so fast that the imager only has the opportunity to capture one or two images of the barcode before it passes out of the field. A delay in energizing either the illumination system or an image sensor can therefore reduce the probability that a good image (an image that contains a decodeable image of a barcode) will be captured.

In the preferred embodiment of this invention, one of the cameras, along with its associated illumination system is used to provide an early detection of an object entering the scan field. Once an object is detected, the rest of the imagers and their illumination systems can be activated. As the object moves through the scan field, the multiple imagers capture images in sequence, as described in co-pending patent application Ser. No. 11/862,568, until such time as a decodeable image has been captured and a decode accomplished, whereupon the illumination systems and/or some of the image sensors are immediately turned off and the scanner returns to the starting condition where only one of the cameras is being used to detect an approaching object. It may also be beneficial to use more then one camera to sense an object moving into the field, to assure the full number of cameras is always enabled as soon as possible, but the essence of this invention is that a subset of the cameras is used to first detect an object and then all cameras are used to image it and decode the bar code affixed to it.

In a typical installation of this kind of scanner, it is known which direction a barcoded object will be moving as it enters the scan field. For example, in nearly all supermarkets, the scanner will be positioned in a check-stand such that objects move from the right to the left (+x direction in FIG. 1) as seen when facing the vertical window of the scanner.

FIG. 1 illustrates a bar code reader with an operator moving an object across the scanner from the right to the left. A system of mirrors directs the field of view of two of the cameras upwards at around 45 degrees through a horizontal window. Since the barcode will likely be coming into the field from the right, a camera C1 will be the first to be able to detect the approaching object. This camera is therefore chosen as the one that is used to enable all the other cameras as soon as it has been determined that an object has entered its field of view.

In some situations different check-stand arrangements might result in different object transport directions, so the reader is adjusted by the user to use different cameras as appropriate as an object identification camera. For example, a user might want the scanner to respond quickly to an object approaching from the left, so he/she can set-up the reader to use camera C3 which looks upwards to the left. It will also be possible to set the scanner to use more then one camera if it isn't known which way objects might be approaching. In either case, once a barcode has been decoded, the scanner reverts to only using the specific imagers that have been designated for object detection until an object is detected. The camera that will be used for object detection can be set by scanning a special barcode or by sending appropriate instructions through the interface from the host or by plugging in an auxiliary hand held scanner to a connector provided for that purpose and scanning a barcode. The scanner can also be shipped from the factory set as the user desires, or at a factory determined default condition that is felt to be best for the majority of installations.

To make object detection even faster, the object detecting camera(s) can capture partial frames in this object detection mode, as this allows them to capture data at a higher frame rate, so they can respond more quickly. The partial frames can be positioned towards the leading edge of the field of view (the edge of the field of view where it is expected that the object will appear first). Once an object is detected, the imager reverts to full frame (or most of the frame if it has more resolution then necessary) mode so it can read a barcode anywhere in the frame.

To avoid accidental detection of objects that are too far away to be readable barcodes, the images collected when the camera is in sensing or object detection mode can be examined for sharp transitions between light and dark areas. Objects that are close enough to the scanner to be in the focus range of the imager optical system will have sharp edges, while those that are too far away to decode will be out of focus will have slow transitions between light and dark areas. If the slope of the transition between light and dark (or dark and light) is higher then a threshold, the scanner determines that the object is close enough to permit decoding a barcode on the object, and all of the imagers and their illumination systems are actuated until decode occurs. If decode doesn't occur after a predetermined interval (user programmable) it is decided that the scanner was falsely enabled and it returns to object detection mode. In some cases it should also be possible to program the scanner to make all the imagers remain activated for a few seconds after a barcode is decoded. This will allow it to read more than one barcode in the field if the user moves more than one object into the field at one time.

The image processor or processors 15 controls operation of the cameras C1-C6. The cameras C1-C6, when operated during an imaging system, generate digital signals 35. The signals 35 are raw, digitized gray scale values which correspond to a series of generated image frames for each camera. For example, for the camera C1, the signal 35 corresponds to digitized gray scale values corresponding to a series of image frames IF1. For the camera C2, the signal 35 corresponds to digitized gray scale values corresponding to a series of image frame IF2, and so on. The digital signals 35 are coupled to a bus interface 42, where the signals are multiplexed by a multiplexer 43 and then communicated to a memory 44 in an organized fashion so that the processor knows which image representation belong to a given camera.

The image processors 15 access the image frames IF1-IF6 from memory 44 and search for image frames that include an imaged target bar code 30'. If the imaged target bar code 30' is present and decodable in one or more image frames, the decoder 16 attempts to decode the imaged target bar code 30' using one or more of the image frames having the imaged target bar code 30' or a portion thereof.

For any individual presentation of a target bar code 30 to the reader windows H, V the exact orientation and manner of presentation of the target bar code 30 to the windows will determine which camera or cameras generate suitable images for decoding. As stated above, it is likely that, for example, sales persons generally or a given sales person, specifically, will develop a pattern of presentation of a target bar code 30 to the windows H, V that results in certain cameras having a higher probability of generating an image frame that includes the imaged target bar code 30' and is suitable for decoding the imaged bar code 30', either alone or in conjunction with other image frames.

Each camera includes a charged coupled device (CCD), a complementary metal oxide semiconductor (CMOS), or other imaging pixel array, operating under the control of the imaging processing system 40. In one exemplary embodiment, the sensor array comprises a two dimensional (2D) CMOS array with a typical size of the pixel array being on the order of 752×480 pixels. The illumination-receiving pixels of the sensor array define a sensor array surface secured to a printed circuit board for stability. The sensor array surface is substantially perpendicular to an optical axis of the imaging lens assembly, that is, a z axis that is perpendicular to the sensor array surface would be substantially parallel to the optical axis of the focusing lens. The pixels of the sensor array surface are disposed in an orthogonal arrangement of rows and columns of pixels.

The reader circuitry 11 includes imaging system 12, the memory 44 and a power supply 11a. The power supply 11a is electrically coupled to and provides power to the circuitry 11 of the reader. Optionally, the reader 10 may include an illumination system 60 (shown schematically in FIG. 7) which provides illumination to illuminate the effective total field of view to facilitate obtaining an image 30' of a target bar code 30 that has sufficient resolution and clarity for decoding.

Figure 6:
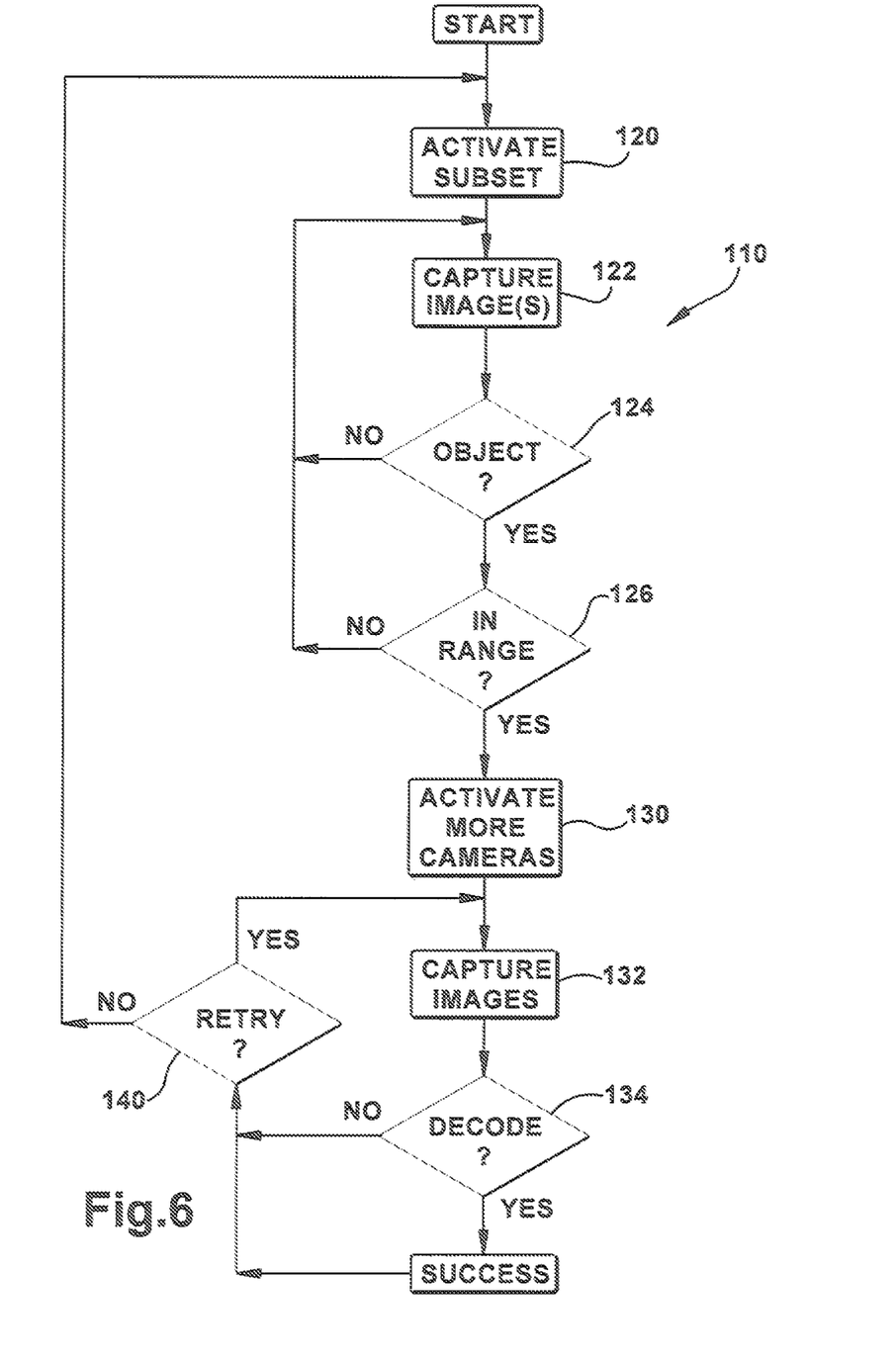
FIG. 6 is a flowchart of an exemplary embodiment of the invention.

The energy savings aspects of the exemplary reader are explained in relation to the flowchart 110 of FIG. 6. For a subset of cameras (typically one such as the camera C3) an associated sensor array and light emitting diode is enabled or activated 120 during an object detection period and images (possibly of lower resolution that used in decoding) of the field of view of the camera or cameras of the subset are captured 122. The processor 15 associated with the camera then determines 124 if a target is within the field of view of the particular camera say camera C1, by evaluating each image frame of the series of image frames IF1. If the processor determines an object is present in an image, the processor then (optionally) determines 126 if the object is within the working range of the reader.

If an object is detected the processor 15 activates 130 all the camera assemblies C1-C6 which begin to capture 132 series of image frames IF1-IF6 from all six cameras. Since many of these captured frames IF1-IF6 will not include an imaged target bar code 30', the image processors 15 of the image processing system 14 analyze the stored image frames IF1-IF6 in memory 44 to find and decode the bar code.

The one or more processors check images 134 to determine if a successful read has occurred. A successful image decode causes the processor or processors to process that in a variety of ways such as provide a signal, transmit the bar code data and set up criteria for use by the processors in determining 140 whether to suspend decode leads to a decision step 140 where the processors determine whether to suspend imaging operation of all six cameras and put the reader back into object detection mode or try to decode more barcodes. This is based on the knowledge that a successful decode may be followed by a user swiping a number of objects in succession and therefore the need to power down a number of cameras is decreased.

For each camera assembly C1-C6, electrical signals are generated by reading out of some or all of the pixels of the pixel array after an exposure period generating the gray scale value digital signal 35. This occurs as follows: within each camera, the light receiving photosensor/pixels of the sensor array are charged during an exposure period. Upon reading out of the pixels of the sensor array, an analog voltage signal is generated whose magnitude corresponds to the charge of each pixel read out. The image signals 35 of each camera assembly C1-C6 represents a sequence of photosensor voltage values, the magnitude of each value representing an intensity of the reflected light received by a photosensor/pixel during an exposure period.

Processing circuitry of the camera assembly, including gain and digitizing circuitry, then digitizes and coverts the analog signal into a digital signal whose magnitude corresponds to raw gray scale values of the pixels. The series of gray scale values GSV represent successive image frames generated by the camera assembly. The digitized signal 35 comprises a sequence of digital gray scale values typically ranging from 0-255 (for an eight bit A/D converter, i.e., $2^8=256$), where a 0 gray scale value would represent an absence of any reflected light received by a pixel during an exposure or integration period (characterized as low pixel brightness) and a 255 gray scale value would represent a very intense level of reflected light received by a pixel during an exposure period (characterized as high pixel brightness). In some sensors, particularly CMOS sensors, all pixels of the pixel array are not exposed at the same time, thus, reading out of some pixels may coincide in time with an exposure period for some other pixels.

Figure 5:
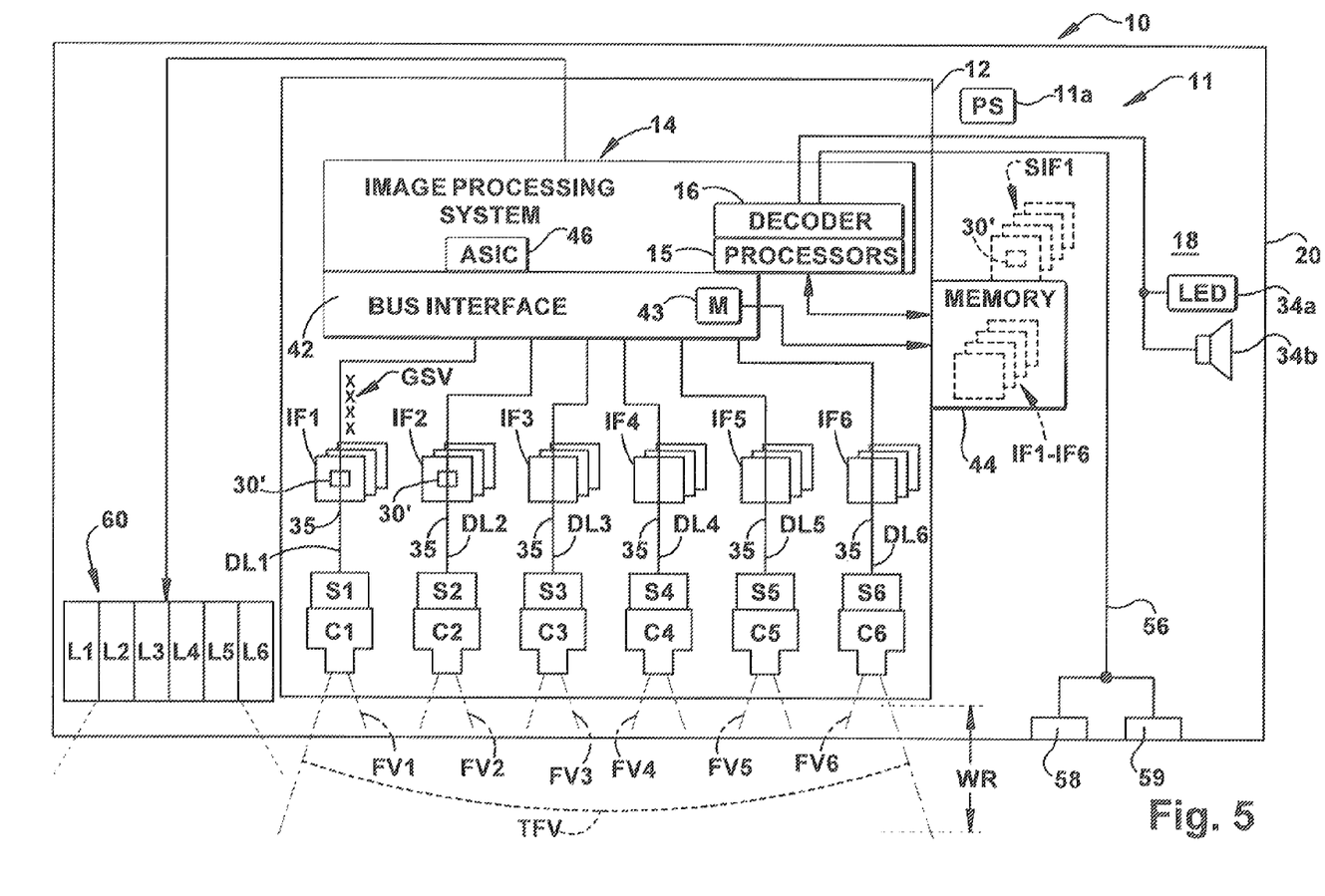
FIG. 5 is a schematic block diagram of selected systems and electrical circuitry of the bar code reader of FIG. 1.

As is best seen in FIG. 5, the digital signals 35 are received by the bus interface 42 of the image processing system 40, which may include the multiplexer 43, operating under the control of an ASIC 46, to serialize the image data contained in the digital signals 35. The digitized gray scale values of the digitized signal 35 are stored in the memory 44. The digital values GSV constitute a digitized gray scale version of the series of image frames IF1-IF6, which for each camera assembly C1-C6 and for each image frame is representative of the image projected by the imaging lens assembly onto the pixel array during an exposure period. If the field of view of the imaging lens assembly includes the target bar code 30, then a digital gray scale value image 30' of the target bar code 30 would be present in the digitized image frame.

The decoding circuitry 14 then operates on selected image frames and attempts to decode any decodable image within the image frames, e.g., the imaged target bar code 30'. If the decoding is successful, decoded data 56, representative of the data/information coded in the target bar code 30 is then output via a data port 58 to an external computer which also may communicate data to the reader used in reprogramming the camera used to detect objects. A successful decode can also be displayed to a user of the reader 10 via a display output 59. Upon achieving a good read of the target bar code 30, that is, the bar code 30 was successfully imaged and decoded, the speaker 34b and/or an indicator LED 34a is activated by the bar code reader circuitry 11 to indicate to the user that the target bar code 30 has successfully read.

While the present invention has been described with a degree of particularity, it is the intent that the invention includes all modifications and alterations from the disclosed design falling within the spirit or scope of the appended claims.

I claim:

1. A multi-camera imaging-based bar code reader for imaging a target bar code on a target object, the bar code reader comprising:
    a housing supporting one or more transparent windows and defining an interior region, a target object being presented in relation to the housing for imaging a target bar code;
    an imaging system including a plurality of cameras wherein each camera is positioned within the housing interior region and defines a field of view which is different than a field of view of each other camera of the plurality of cameras and combine to form a bar code reader field of view, each camera including a sensor array; and
    an image processing system comprising a processor having a stored program for evaluating images from a subset of cameras that define the bar code reader field of view to determine a presence of a target object and once a target object is detected, to activate an additional one or more cameras for use in decoding a barcode.

2. The bar code reader of claim 1 wherein the processing system determines an optimum subset of cameras for determining a presence of a target object based on a user input.

3. The bar code reader of claim 1 wherein in determining a presence of a target object based on images from the subset of cameras the image processing system evaluates partial images.

4. The bar code reader of claim 1 wherein the image processing system determines if the object is within a working range of the reader.

5. A method of operating a multi-camera imaging-based bar code reader for imaging a target bar code comprising:
    providing an imaging-based bar code reader including a housing supporting one or more transparent windows and defining an interior region;
    positioning multiple cameras having sensor arrays within the housing interior to define different fields of view for each of said plurality of cameras to define a bar code reader field of view;
    activating a subset of cameras less than a totality of cameras in said reader to detect an object moving through or occupying a position within a field of view of one or more cameras in said subset of cameras;
    activating additional cameras not in said subset and obtaining images from said additional cameras to decode a bar code on said target object; and
    interpreting images from the multiple cameras to decode a bar code on the target object.

6. The method of claim 5 wherein before activating the additional cameras, a processor determines if the object that was sensed is moving or located within a working range of the reader.

7. The method of claim 5 wherein the subset is a single camera and wherein the single camera is chosen based on typical user tendencies in scanning objects through the reader's field of view.

8. The method of claim 5 wherein the step of activating additional cameras includes turning on an LED associated with the additional cameras as well as activating sensor arrays of said additional cameras.

9. The method of claim 5 additionally comprising adjusting the subset of cameras based on varying parameters.

10. The method of claim 5 additionally comprising evaluating the position of the object before activating the additional cameras.

11. The method of claim 10 wherein the step of evaluating a position of the object is performed by evaluating transitions from dark to light in the image.

12. The method of claim 5 wherein the object detection is performed on partial image frames from the subset of cameras to speed object detection.

13. The method of claim 12 wherein a leading edge of an image is used in detecting the object.

14. An imaging system for use in a multi-camera imaging-based bar code reader having a housing supporting one or more transparent windows and defining an interior region, a target object being presented to the plurality of windows for imaging a target bar code on a target object, the imaging system comprising:
   a plurality of camera assemblies coupled to an image processing system, each camera assembly of the plurality of camera assemblies being positioned within the housing interior position and defining a field of view which is different than a field of view of each other camera assembly of the plurality of camera assemblies, each camera assembly including a sensor array, an imaging lens assembly for focusing the field of view of the camera assembly onto the sensor array and an illumination device that helps define a camera field of view; and
   one or more processors for evaluating images captured by one camera assembly to first determine a presence of an object within a reader field of view and then to search for decodable bar code on an object from images from other camera assemblies of said plurality of camera assemblies.

15. The imaging system of claim 14 wherein the one or more processors activate sensor arrays and illuminating devices for certain camera assemblies only after an object is detected in a reader field of view.

16. The imaging system of claim 14 including a communications port for communicating with other devices for reprogramming an object search routine of said one or more processors.

17. The imaging system of claim 14 wherein the one or more processors evaluate lower resolution images from the one camera assembly in determining a presence of an object in the reader field of view.

18. A multi-camera imaging-based bar code reader for imaging a target bar code on a target object, the bar code reader comprising:
   housing means supporting a plurality of transparent windows and defining an interior region bounded in part by the plurality of windows for imaging a target bar code;
   imaging means including a plurality of camera assemblies means coupled to an image processing system means wherein each camera assembly means of the plurality of camera assemblies means is positioned within the housing interior and define a field of view which is different than a field of view of each other camera assembly means of the plurality of camera assemblies means;
   sensing means for each camera assembly means including a sensor array, an imaging lens assembly for focusing the field of view of the camera assembly means onto the sensor array, and an illuminating device for shining light onto a camera assembly field of view;
   memory means for storing images from the sensing means;
   processing means for determining a presence of an object by activating one camera assembly, evaluating images from the one camera assembly and activating additional camera assemblies once an object is detected; and
   decoder means for evaluating images from a plurality of camera assemblies for determining a content of an identified bar code on a detected object.

19. Computer-readable media having computer-executable instructions for performing a method of operating an imaging-based bar code reader having multiple cameras for efficiently imaging a target bar code on a target object, the steps of the method comprising:
   activating a subset of cameras less than a totality of cameras in said reader to detect a target object moving through or occupying a position within a field of view of one or more cameras in said subset of cameras;
   activating additional cameras not in said subset and obtaining images from said additional cameras and storing said images in a memory; and
   interpreting images from the multiple cameras in the bar code reader to decode a bar code on the target object.

20. The computer readable medium of claim 19 wherein before activating the additional cameras the instructions determine if the object that was sensed is moving or located within a working range of the reader.

21. The computer readable medium of claim 19 wherein the subset is a single camera and wherein the instructions choose said single camera based on typical user tendencies in scanning objects through the reader's field of view.

22. The computer readable medium of claim 19 wherein the instructions activate additional cameras including turning on an LED associated with the additional cameras as well as activating sensor arrays of said additional cameras.

23. The computer readable medium of claim 19 wherein the instructions adjust the subset of cameras based on varying parameters.

* * * * *